(12) United States Patent
Lamias et al.

(10) Patent No.: US 12,143,364 B2
(45) Date of Patent: Nov. 12, 2024

(54) DEVICE, SYSTEM, AND METHOD FOR PROVISIONING FIREWALL ENGINES

(71) Applicant: MOTOROLA SOLUTIONS, INC., Chicago, IL (US)

(72) Inventors: Christina Lamias, Chicago, IL (US); Francisco Javier Jorda Hernandez, Alicante (ES); Guna Selvaraj, Chicago, IL (US); Jeanne C. Glunz, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 253 days.

(21) Appl. No.: 17/966,189

(22) Filed: Oct. 14, 2022

(65) Prior Publication Data

US 2024/0129276 A1    Apr. 18, 2024

(51) Int. Cl.
*H04L 9/40* (2022.01)

(52) U.S. Cl.
CPC ...... *H04L 63/0263* (2013.01); *H04L 63/0218* (2013.01); *H04L 63/0236* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 7,406,534 B2* | 7/2008 | Syvanne | H04L 63/0209 709/224 |
| 9,021,549 B2 | 4/2015 | Gronich et al. | |
| 11,245,614 B1* | 2/2022 | Backes | H04L 12/4641 |
| 11,483,288 B1* | 10/2022 | Dunn | H04L 63/0218 |
| 2013/0152187 A1* | 6/2013 | Strebe | H04L 63/20 726/11 |
| 2015/0142962 A1 | 5/2015 | Srinivas et al. | |
| 2017/0163606 A1* | 6/2017 | Yin | H04L 63/20 |
| 2018/0083922 A1 | 3/2018 | Yin | |
| 2018/0343236 A1* | 11/2018 | Pillay-Esnault | H04L 63/20 |
| 2021/0084013 A1 | 3/2021 | Mutnuru | |
| 2022/0385632 A1* | 12/2022 | Naidoo | H04L 63/0263 |

(Continued)

OTHER PUBLICATIONS https://lp.tufin.com/rs/769-ICF-145/images/APG_Whitepaper.pdf, dated 2015.

*Primary Examiner* — Lashonda Jacobs-Burton
(74) *Attorney, Agent, or Firm* — PERRY + CURRIER, INC.

(57) ABSTRACT

A device, system and method for provisioning firewall engines is provided. A device, in an observation mode: implements, for a given zone, an application and a firewall engine in an observation mode by: implementing predefined firewall rules that define allowed network traffic and/or denied network traffic for the application; maintaining a log of network traffic events that meet or do not meet the predefined firewall rules, the log including source and destination network identifiers for the network traffic events; grouping the network traffic events into groups based on the source and destination network identifiers; generating new firewall rules based on the groups; and accepting or denying respective new firewall rules. The device, after the observation mode is implemented, switches the application and the firewall engine to a maintain mode by: stopping implementing the predefined firewall rules; and implementing accepted new firewall rules for the application.

20 Claims, 9 Drawing Sheets

(56) References Cited

U.S. PATENT DOCUMENTS

| | | | |
|---|---|---|---|
| 2023/0012719 A1* | 1/2023 | Reimer | H04L 63/0263 |
| 2023/0179572 A1* | 6/2023 | Kambi Ravi | H04L 63/0263 726/1 |
| 2023/0188570 A1* | 6/2023 | Bollineni | H04L 63/1425 726/1 |
| 2023/0308419 A1* | 9/2023 | Lee | H04L 63/0263 |

* cited by examiner

DEVICE, SYSTEM, AND METHOD FOR PROVISIONING FIREWALL ENGINES

BACKGROUND OF THE INVENTION

Many entities are moving to cloud-based hosting to implement applications for their daily operations. As a result, these entities may be implementing network micro-segmentation environments in which the applications are implemented in zones, and the applications may be implemented independent of each other. Hence, firewall engines for the applications need to be provisioned for various instances of the applications, which, due to the micro-segmentation environment, may be challenging.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
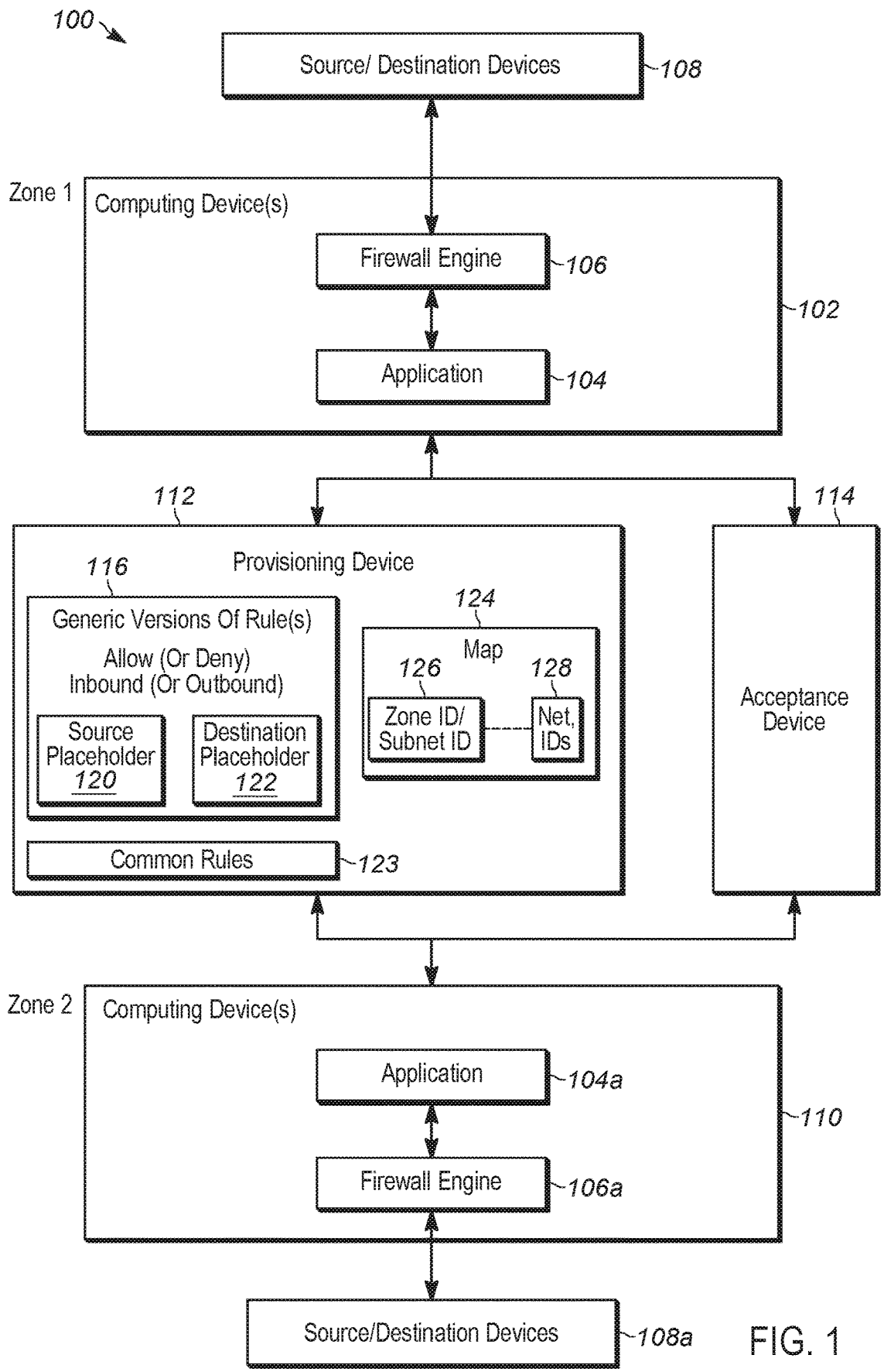
FIG. 1 is a system for provisioning firewall engines, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Many entities are moving to cloud-based hosting to implement applications for their daily operations. As a result, these entities may be implementing network micro-segmentation environments in which the applications are implemented in zones, and the applications may be implemented independent of each other. Hence, firewall engines for the applications need to be provisioned for various instances of the applications, which, due to the micro-segmentation environment, may be challenging. For example, firewall rules implemented by the firewall engines at instances of the application, in different zones, may need to be customized as network traffic to and from the applications in the different zones may be different. Thus, there exists a need for an improved technical method, device, and system for provisioning firewall engines. It is understood that such provisioning for firewall engines includes, but it not limited to, provisioning firewall rules and/or firewall policies at a firewall engine. Hereafter, the terms firewall rules and firewall policies are used interchangeably.

Hence, provided herein is a device, system and method for provisioning firewall engines. For example, a system is provided that includes one or more computing devices (e.g. cloud based devices and/or servers) at which an application and an associated firewall engine are implemented. The application and the associated firewall engine may be implemented for a given zone (e.g. a range of Internet Protocol (IP) addresses dedicated to an instance of an application), for example in a micro-segmentation environment in which different instances of the application are deployed for different zones and/or subnets in the cloud. In such a micro-segmentation environment, the instances of the application are serviced by associated firewall engines, which implement respective firewall rules to control network traffic to and/from the applications. Hence, the application and associated firewall engine may be one of a plurality of instances of the application and associated firewall engines for different zones in a micro-segmentation environment. As will be described herein, associated firewall engines associated with the zones are to be provisioned with respective firewall rules.

In general, the one or more computing devices may initially implement the application and the firewall engine in an observation mode in which predefined firewall rules are implemented. The predefined firewall rules generally define one or more of allowed network traffic and denied network traffic for the application. Furthermore, the predefined firewall rules may generally define one or more of allowed inbound network traffic (e.g. inbound to the application), allowed outbound network traffic (e.g. outbound from the application), denied inbound network traffic, and denied outbound network traffic.

Generic versions of the predefined firewall rules may be received from a provisioning device, the generic versions including placeholder fields for source and destination network identifiers that may be replaced with respective source and destination network identifiers that are particular to a given zone in which the application is being implemented; the respective source and destination network identifiers may be determined from a "map" that associates zones and/or subnets with respective network identifiers (e.g.

internet protocol (IP) addresses), that may also be obtained from the provisioning device. Such a provisioning device may provide similar services for computing devices in different zones that implement other instances of the application and the firewall engine.

In the observation mode, at the one or more computing devices associated with the given zone for which the application and the firewall engine is being implemented, the predefined firewall rules may be implemented in a given order, such that when an instance of network traffic being processed by the firewall engine meets a predefined firewall rule that is higher in the given order, that predefined firewall rule is implemented, for example to deny or allow the instance of network traffic. That allowance or denial is logged in a log of network traffic events that meet or do not meet the predefined firewall rules.

However, network traffic that does not meet any of the predefined firewall rules is also allowed in the observation mode, and associated network traffic events are maintained in the log.

In the observation mode, the one or more computing devices may group the network traffic events (e.g. from the log) into groups based on the source network identifiers and the destination network identifiers. For example, network events that are inbound or outbound to groups of IP addresses associated with a same zone and/or subnet may be grouped together. Such groups may be determined using the aforementioned map.

In the observation mode, the one or more computing devices generate new firewall rules based on the groups. The new firewall rules may include a network identifier associated with the application (e.g. to define a source or destination for network traffic, respectively, for outbound and inbound new firewall rules), as well as identifiers of zones and/or subnets of IP addresses that lead to the groupings. Hence, the new firewall rules may comprise a deduplicated and consolidated representation of the network events of the log, with zones and/or subnets, and the like, indicated instead of IP addresses.

In the observation mode, the respective new firewall rules are accepted or denied, for example using machine learning, and the like, and/or acceptance or denial may be at least partially based on receipt of input via an input device.

In some specific examples, the respective new firewall rules may be accepted or denied by providing the respective new firewall rules using an acceptance device configured to accept or deny firewall rules. For example, the new firewall rules may be provided to the acceptance device, which may process the new firewall rules to accept or deny the new firewall rules, and provide an indication of such acceptance or denial back to the one or more computing devices. Such acceptance or denial may occur via machine learning, and the like, and/or may be at least partially based on receipt of input via an input device.

In yet further examples, the acceptance or denial of the new firewall rules may be performed as a two-step process, in which acceptance or denial of the new firewall rules first occurs at the one or more computing devices, and new firewall rules which are accepted by the one or more computing devices are provided to the acceptance device, which may accept or deny the new firewall rules which were accepted by the one or more computing devices. The acceptance device provides an indication of such acceptance or denial back to the one or more computing devices.

Regardless of specifics of the acceptance or denial process, the one or more computing devices switches the application and the firewall engine from the observation mode to a maintain mode by: stopping implementing of the predefined firewall rules; and implementing accepted new firewall rules for the application.

Put another way, in the observation mode, the one or more computing devices collects a log of network traffic that meet and/or do not meet the predefined firewall rules, groups the network events, for example using deduplication techniques and according to associated zones of IP addresses of devices that are external to the one or more computing devices, and generates proposed new firewall rules from the groupings. The new firewall rules are accepted or denied using any suitable technique, and accepted new firewall rules are implemented in the firewall engine in the maintain mode, in place of the predefined firewall rules. In some examples, the accepted new firewall rules may define allowed network traffic, and hence, in the maintain mode, any network traffic that does not meet one or more of the accepted new firewall rules is denied.

In some examples, the switch from the observation mode to the maintain mode may occur after a given time period (e.g. such as two weeks, three weeks, amongst other possibilities). In other examples, as new firewall rules are generated and accepted in the observation mode, the new firewall rules may be implemented by the firewall engine after the predefined firewall rules in the given order. When no further new firewall rules are generated and accepted, after one or more of the new firewall rules are implemented in the given order, the switch from the observation mode to the maintain mode may occur.

An aspect of the present specification provides a method comprising: at one or more computing devices, implementing, for a given zone, an application and a firewall engine in an observation mode by: implementing predefined firewall rules that define one or more of allowed network traffic and denied network traffic for the application; maintaining a log of network traffic events that meet or do not meet the predefined firewall rules, the log including source network identifiers and destination network identifiers for the network traffic events; grouping the network traffic events into groups based on the source network identifiers and the destination network identifiers; generating new firewall rules based on the groups; and accepting or denying respective new firewall rules; and, after the observation mode is implemented, switching, at the one or more computing devices, the application and the firewall engine to a maintain mode by: stopping implementing the predefined firewall rules; and implementing accepted new firewall rules for the application.

Another aspect of the present specification provides a device comprising: a controller configured to: implement, for a given zone, an application and a firewall engine in an observation mode by: implementing predefined firewall rules that define one or more of allowed network traffic and denied network traffic for the application; maintaining a log of network traffic events that meet or do not meet the predefined firewall rules, the log including source network identifiers and destination network identifiers for the network traffic events; grouping the network traffic events into groups based on the source network identifiers and the destination network identifiers; generating new firewall rules based on the groups; and accepting or denying respective new firewall rules; and after the observation mode is implemented, switch the application and the firewall engine to a maintain mode by: stopping implementing the predefined firewall rules; and, implementing accepted new firewall rules for the application.

Each of the above-mentioned aspects will be discussed in more detail below, starting with example system and device architectures of the system, in which the embodiments may be practiced, followed by an illustration of processing blocks for achieving an improved technical method, device, and system for provisioning firewall engines.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, reference will be made to engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Attention is directed to FIG. 1, which depicts an example system 100 for provisioning firewall engines. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises one or more computing devices 102 generally configured to implement an application 104 and an associated firewall engine 106. In general, the application 104 may comprise any suitable application which may generally "need" to communicate with other devices 108 to function; for example, the application 104 may comprise human resource (HR) application for an entity (e.g. such as a business, and the like), a supply chain and/or logistics application for the entity, and/or any other suitable application.

The other devices 108 are generally labelled as source/destination devices in FIG. 1. For example, the other devices 108 may comprise network servers, employee communication devices (e.g. employees of the entity), and the like, that may be destinations for network traffic from the application 104, and/or may be sources of network traffic to the application 104, for example to implement HR functionality and/or supply chain functionality and/or logistics functionality, and/or any other suitable functionality of the application 104. As the application 104 may depend on the devices 108 to function, the devices 108 may generally represent network dependencies of the application 104 (e.g. as the application 104 is generally understood to communicate with the devices 108 via a one or more networks represented by a communication link therebetween in FIG. 1). However, any suitable network traffic is within the scope of the present specification and such network traffic may or may not represent network dependencies of the application 104.

However, it is understood that network traffic between the application 104 and the devices 108 is via the firewall engine 106 which is generally configured to allow or deny network traffic based on firewall rules, as described herein.

As depicted, it is understood that the application 104 and the firewall engine 106 have been deployed to service a given zone, for example, as depicted, a zone labelled "Zone 1". Put another way, the one or more computing devices 102 may comprise cloud computing device and/or servers which implement the application 104 and the firewall engine 106 for the given zone in a micro-segmentation environment. In such a micro-segmentation environment, a plurality of instances of the application 104 and the firewall engine 106 may be deployed for a plurality of zones and the instances of the application 104 and the firewall engine 106 may service the different zones relatively independent of each other.

For example, as depicted a second instance of the application 104 and the firewall engine 106, respectively labelled application 104a and firewall engine 106a, are being implemented at another one or more computing devices 110 for another zone, labelled "Zone 2" in FIG. 1. The application 104a may depend on devices 108a to function, and/or network traffic in Zone 2 may be between the application 104a and the devices 108a (e.g. and allowed or denied by the firewall engine 106a). While the devices 108a are depicted as being separate from the devices 108, the devices 108 may comprise a portion of the devices 108a, and/or the devices 108a may comprise a portion of the devices 108. For example, while not depicted, one or more of the devices 108, 108a may comprise a common central repository of HR and/or logistics data, while others of the devices 108, 108a may comprise communication devices of employees that are particular to a respective zone of the instances of the application 104.

Put another way, the devices 108, 108a may be associated with any suitable zone and/or subnet, and not only a zone serviced by a respective instance of the application 104.

Hereafter, for clarity, instances of the applications 104, 104a and the firewall engines 106, 106a will be respectively referred to collectively as the instances of the application 104 and instances of the firewall engine 106.

Furthermore, the one or more computing devices 102 are interchangeably referred to hereafter as the computing device 102 and, similarly, the one or more computing devices 110 are interchangeably referred to hereafter as the computing device 110.

While two zones and two instances of the application 104 and the firewall engine 106 are depicted, the system 100 may comprise any suitable number of zones and/or instances of the application 104 and the firewall engine 106, deployed in a micro-segmentation environment. It is understood that the zones may be for different parts of the world and/or the zones may be associated with different geographic areas. Furthermore, the instances of the application 104 are understood to be associated with different network identifiers, such as different IP addresses.

Indeed, it is understood that such a micro-segmentation environment differs from a flat network environment in which an application, and/or group of applications, may share a common data lake of information and/or data and in which a common firewall engine is used and/or commonly configured firewall engines (e.g. using same firewall rules across the firewall engines) is used. In a flat network environment, the firewall rules may generally be more complex than in a micro-segmentation environment as the firewall rules generally cover all instances of all devices in a network with which the application is to communicate (e.g. worldwide).

However, the micro-segmentation environment introduces other challenges as provisioning the instances of the firewall engine 106 may be complex. For example provisioning respective firewall rules at the instances of the firewall engine 106 may be complex.

As depicted, the system 100 further comprises a provisioning device 112 and an acceptance device 114. While the devices 112, 114 are depicted as being separate from each other, the devices 112, 114 may, in some examples, be combined and/or their functionality may be combined into one computing device, and/or their functionality may be combined into one or more computing devices, such as one or more cloud computing devices and/or servers.

In some examples, the provisioning device 112 generally stores generic versions 116 of predefined firewall rules that may be customized for particular instances of the firewall engine 106 in a given zone. Hereafter, generic versions 116 of predefined firewall rules are interchangeably referred to as the generic predefined firewall rules 116. For example, one example generic predefined firewall rule 116 is depicted that includes placeholder fields 120, 122 for respective source network identifiers and respective destination network identifiers. While not depicted, a generic predefined firewall rule 116 may further include one or more placeholder fields for one or more ports (e.g. software ports) associated with an application 104, and via which network data may be provided.

Furthermore, while not depicted, different generic versions 116 of predefined firewall rules may be specific for different types of applications and/or for different types of protocols. For example, for applications that are internal to an entity associated with the system 100 (e.g. applications that do not generally access publicly available websites, such as HR applications, supply chain applications, logistics applications, and the like), a deny generic version 116 of a predefined firewall rule for such applications may be to deny access to any webserver and/or internet server that is not internal to, and/or operated by the entity. Similarly, for applications that internet-facing, and do rely on generally accessing publicly, an allow generic version 116 of a predefined firewall rule may be to allow such applications to access certain webservers and/or internet servers that are not operated by the entity.

Similarly, an allow generic version 116 of a predefined firewall rule may be to allow network traffic provided according to a first protocol, while a deny generic version 116 of a predefined firewall rule may be to deny network traffic provided according to a second protocol. For example, an allow generic version 116 of a predefined firewall rule may be to allow network traffic provided according to a Secure Shell (SSH) protocol, and a deny generic version 116 of a predefined firewall rule may be to deny network traffic provided according to a File Transfer Protocol (FTP).

Hence, a generic version 116 of a predefined firewall rule may be specific for a given application type and/or a given protocol type.

The generic predefined firewall rule 116 may be to allow network traffic or deny network traffic that meets the generic predefined firewall rule 116 when the placeholder fields 120, 122 are populated. Furthermore the generic predefined firewall rule 116 may be for inbound or outbound network traffic.

While only one example generic predefined firewall rule 116 is depicted, any suitable number of generic predefined firewall rules 116 may be provided.

Hence, the generic versions 116 of predefined firewall rules may include, but are not limited to, a generic predefined firewall rule 116 for allowed inbound (e.g. inbound to an instance of the application 104) network traffic, a generic predefined firewall rule 116 for allowed outbound (e.g. outbound from an instance of the application 104) network traffic, a generic predefined firewall rule 116 for denied inbound network traffic, and a generic predefined firewall rule 116 for denied outbound network traffic, amongst other possibilities. Such generic versions 116 of predefined firewall rules may be for devices 108 associated with the entity associated with the application 104.

However, as will be described below, in some examples, an instance of an application 104 may be configured to communicate with an internet server and/or webserver which is not associated with the entity associated with the application 104. As such, the generic versions 116 of predefined firewall rules may include, but are not limited to, allowed inbound network traffic for one or more internet servers and/or webservers, allowed outbound network traffic for one or more internet servers and/or webservers, denied inbound network traffic for one or more internet servers and/or webservers, denied outbound network traffic for one or more internet servers and/or webservers, and the like.

As depicted, the provisioning device 112 further generally stores a "map" 124 of zone/subnet identifiers 126 of the zones associated with the zone identifiers, and associated network identifiers 128. For example, a given zone may be assigned a name/or alphanumeric identifier, and a zone identifier 126 may comprise such a name/or alphanumeric identifier. Furthermore, the given zone may be associated with a plurality of network identifiers, such as the network identifiers 128. Furthermore, the given zone may be divided into different subnets and a given subnet may also be assigned a name/or alphanumeric identifier, and a subnet identifier 126 may comprise such a name/or alphanumeric identifier. The given subnet may be associated with subset of the network identifiers 128 associated with the given zone.

Furthermore, network identifiers 128 associated with a given zone and/or subnet may be static or dynamic at the map 124. For example, a given subnet may be associated with a particular group of employees of the entity that regularly access the application 104 in a particular zone (e.g. a particular part of the world), however an employee may first log-in to an employee server (not depicted) using their log-in credentials; the server may be associated with a particular subnet identifier 126. However, the employee may use different communication devices (e.g. such as one of the devices 108) for such a log-in (e.g. a mobile communication device or a home communication device, such as a lap-top, and the like), which have different IP addresses. When the employee uses a new communication device for the log-in (e.g. and presuming the log-in is successful and/or verified), the network identifier 128 of that communication device may be associated with the subnet identifier 126 of the server. In this manner, the map 124 may be populated and/or dynamically populated and/or dynamically updated.

However, the map 124 may be initially populated based on known communication devices (e.g. one or more of the devices 108) that have been deployed by the entity, such as personal computers located at particular locations associated with a given zone, and which have known associated network identifiers 128.

Furthermore, the map 124 may store network identifiers 128 associated with given zones and/or subnets to which network traffic is to be allowed and network identifiers 128 associated with given zones and/or subnets to which network traffic is to be denied. For example, a given employee may leave the entity (e.g. the given employee may quit and/or be fired) and not return their communication device associated with a particular network identifier 128, and/or the given employee may attempt to use their log-in credentials from a particular network identifier 128. Such network identifiers 128 may be added to the map 124, in association with a given zone (and/or given zones) and/or in in association with a given subnet (and/or given subnets) as network identifiers 128 for which network traffic is to be denied.

Furthermore, the map 124 may indicate, for a given zone (e.g. as defined by a zone identifier 126) whether network traffic is to be allowed or denied for a given application type and/or a given protocol type.

Furthermore, the map 124 may comprise a project container for the application 104 which includes information that defines one or more network identifiers for the application 104 (e.g. such as the IP address of the application 104 and/or a range of IP addresses for the application 104), and/or any other suitable information, such as a type of the application 104.

Figure 5:
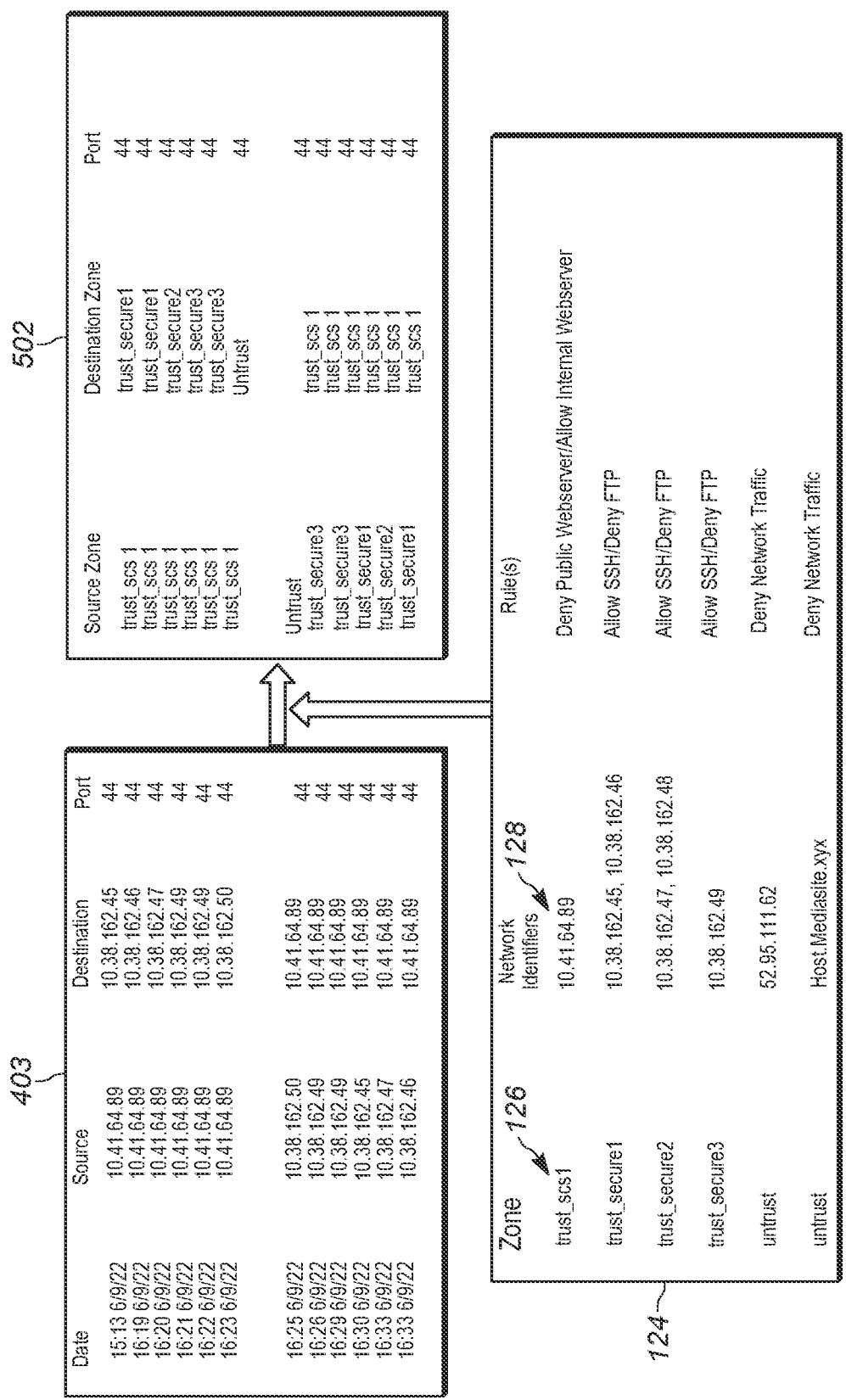
FIG. 5 depicts an example log maintained by the computing device in the observation mode, a map used to group network events of the log, and example of an intermediate step in performing such groupings, in accordance with some examples.

Hence it is understood that the map 124 may be generated and/or maintained in any suitable manner. Furthermore, the map 124 may be in any suitable format including, but not limited to, one or more of a database format, a spreadsheet format, a comma-separated values (CSV) format, and the like. An example of the map 124 is depicted in FIG. 5, described below.

Furthermore, while the map 124 is described with respect to devices 108 that are associated with given zones and/or subnets, the map 124 may further include network identifiers 128 associated with given internet servers and/or webservers, and the like, which may not be associated with a zone and/or subnet.

It is furthermore understood that the placeholder fields 120, 122 of the generic versions 116 of predefined firewall rules may be populated using the map 124, for example according to information in the map 124 (e.g. such as policies or rules) that indicates, for a given zone, whether network traffic is to be allowed or denied for a given application type and/or a given protocol type for a predefined firewall rule. For example, the map 124 may include network identifiers 128 for a plurality of zones (e.g. Zone 1 and Zone 2), and for an instance of the application 104 associated with a given zone (e.g. Zone 1), the placeholder fields 120, 122 may be populated with network identifiers 128 associated with the given zone and/or a given subnet of the given zone to generate a predefined firewall rule that may initially be implemented by the firewall engine 106.

Whether the network identifiers 128 for a given zone are used to populate placeholder fields 120, 122 of an allow or deny generic version 116 of a predefined firewall rule for the application 104 may depend on: a type of the generic version 116 of a predefined firewall rule (e.g. whether the generic version 116 of a predefined firewall rule is for a particular application type and/or for a particular protocol type); a type of the application 104 (e.g. which may be stored in the map 124 and/or determined in any other suitable manner); and the information in the map 124 that indicates, for a given zone, whether network traffic is to be allowed or denied for a given application type and/or a given protocol type for a generic version 116 of a predefined firewall rule. For example, a generic version 116 of a predefined firewall rule may for a specific application type and/or protocol type, and the respective placeholder fields 120, 122 of the generic version 116 of a predefined firewall rule may be populated based on the information of the map 124 that defines whether network traffic for a given type of the application 104 and/or for a protocol type for a given zone is to be allowed or denied.

It is further understood that, for an "inbound" generic version 116 of a predefined firewall rule, a destination placeholder field 122 may comprise the IP address of the application 104, and, similarly, for an "outbound" generic version 116 of a predefined firewall rule, a source placeholder field 122 may comprise the IP address of the application 104.

Hence, it is understood that the generic versions 116 of predefined firewall rules may be customized for an instance of the application 104 and the firewall engine 106 associated with a given zone. Hence, predefined firewall rules may be generated for the firewall engine 106 being implemented in association with Zone 1, and different predefined firewall rules may be generated for the application 104a being implemented in association with Zone 2.

Furthermore, when present, the generic versions 116 of predefined firewall rules may include placeholder fields for ports, identification numbers used to identify applications, and/or any other suitable identifier that identifies and/or indicates network traffic used for instances of an application 104 in a given zone. Such placeholder fields may be populated based on information stored at the map 124 (not depicted) which indicates ports and/or identification numbers used to identify applications, and the like, used for instances of an application 104 and/or ports and/or identification numbers used to identify applications, and the like, used for instances of an application 104 in a given zone. Alternatively, placeholder fields for ports and/or identification numbers used to identify applications, and the like, may be populated based on information stored at the one or more computing devices 102 (e.g. as the ports and/or identification numbers used to identify applications, and the like, may be particular to the one or more computing devices 102). Hereafter, while examples are described with reference to ports, it is understood that such examples may include and/or alternatively include identification numbers used to identify applications, and/or any other suitable identifier that identifies and/or indicates network traffic used for instances of an application 104 in a given zone.

As depicted, the provisioning device 112 may further store common rules 123 which may define allowed and/or denied network traffic that may be common to the instances of the application 104 and the firewall engine 106 across the zones, including, but not limited to, chatter, and the like. For example the common rules 123 may indicate that network traffic that is inbound to, and/or outbound from, the provisioning device 112 and the acceptance device 114 is allowed. In particular, the common rules 123 may comprise rules that may be used across many applications (including the instances of the application 104 and/or other applications), and may include, but are not limited to, rules that define allowed network traffic for Network Time Protocol (NTP) network traffic, Domain Name Services (DNS) network traffic, Time Synchronization Services network traffic, and/or any other network traffic for protocols and/or services, and the like, used by applications to implement common network based functionality that may be independent of the "main" functionality of an application. Network traffic for such protocols and/or services, and the like may be referred to as the aforementioned "chatter".

The acceptance device 114 may comprise any suitable device which may be used to accept or deny a predefined firewall rule as described herein.

In general, the one more computing devices 102 may implement the application 104 and the firewall engine 106 in at least two modes: an observation mode and a maintain mode.

In some examples, the observation mode may be implemented for a given time period (e.g. one week, two weeks and/or any other suitable given time period, which may be configured in the system 100) and thereafter the maintain mode may be implemented.

Alternatively, as new firewall rules are generated and accepted in the observation mode, as described herein, the new firewall rules may be implemented by the firewall engine, after the predefined firewall rules in the given order. When no further new firewall rules are generated and accepted, after one or more of the new firewall rules are implemented in the given order, the switch from the observation mode to the maintain mode may occur.

In the observation mode, the firewall engine 106 implements predefined firewall rules, for example based on the generic versions 116 of predefined firewall rules.

Furthermore, the predefined firewall rules may be implemented in a given order. For example, "deny" predefined firewall rules may be implemented prior to "allow" firewall rules, and/or the predefined firewall rules may be implemented in any suitable order. When network traffic meets a first predefined firewall rule that is higher in the given order (e.g., than a second predefined firewall rule), that network traffic is allowed or denied according to the first predefined firewall rule and that network traffic is no longer compared to any remaining predefined firewall rules in the given order. In the given order, the common rules 123 are understood to be implemented first and/or before the predefined firewall rules.

Furthermore, in the observation mode, the one more computing devices 102 maintains a log of network traffic events that meet or do not meet the predefined firewall rules; however, it is further understood that the log may exclude network traffic that meet the common rules 123. An example of the log is described with respect to FIG. 5.

Network traffic that meets a "deny" predefined firewall rule is denied, whereas network traffic that meets an "allow" predefined firewall rule is allowed. Network traffic that does not meet any of the predefined firewall rules is generally allowed in the observation mode (e.g. unless that network traffic meets a "deny" common rule). The log generally includes source network identifiers and destination network identifiers for the network traffic events. Hence, in the observation mode, the one or more computing device 102 collects information regarding allowed or denied network traffic (e.g. excluding allowed or denied network traffic that meet the common rules 123).

In the observation mode, as the log is being maintained and/or populated, and/or at the end of the aforementioned given time period, the one more computing devices 102, groups the network traffic events of the log into groups based on the source network identifiers and the destination network identifiers, for example using the map 124 to identify network traffic that is inbound or outbound to a given zone and/or subnet. Furthermore, inbound network events in which data, and the like, is received from devices 108 having network identifiers 128 associated with same zone/subnet identifier 126 are grouped. Similarly, outbound network events in which data, and the like, is provided to devices 108 having network identifiers 128 associated with same zone/subnet identifier 126 are grouped. Such grouping may include, but is not limited to, deduplicating similar and/or same network events (e.g. network events associated with same network identifiers 128).

In the observation mode, the one more computing devices 102, generate new firewall rules based on the groups. For example, one group may comprise a list of network identifiers 128 associated with a same zone and/or subnet identifier 126 to which outbound network traffic was provided (e.g. and not denied). Hence, a new firewall rule may comprise an outbound firewall rule which includes the IP address associated with the application 104 (e.g. for the given zone and/or Zone 1) as a source network identifier and further includes the subnet identifier 126 (e.g. rather than the network identifiers 128) as a destination network identifier.

Similarly, another group may comprise a list of network identifiers 128 associated with a same zone and/or subnet identifier 126 from which inbound network traffic was received (e.g. and not denied). Hence, a new firewall rule may comprise an inbound firewall rule which includes the IP address associated with the application 104 (e.g. for the given zone and/or Zone 1) as a destination network identifier and further includes the subnet identifier 126 (e.g. rather than the network identifiers 128) as a source network identifier.

Similarly, another group may comprise a list of IP addresses associated with an internet server and/or a webserver from which inbound network traffic was received (e.g. and not denied). Hence, a new firewall rule may comprise an inbound firewall rule which includes the IP address associated with the application 104 (e.g. for the given zone and/or Zone 1) as a destination network identifier and further includes an identifier of the internet server and/or the webserver, such as a fully qualified domain name (FQDN), and the like, rather than the network identifiers 128, as a source network identifier.

Similarly, another group may comprise a list of IP addresses associated with an internet server and/or a webserver to which outbound network traffic was provided (e.g. and not denied). Hence, a new firewall rule may comprise an outbound firewall rule which includes the IP address associated with the application 104 (e.g. for the given zone and/or Zone 1) as a source network identifier and further includes an identifier of the internet server and/or the webserver, such as an FQDN, rather than the network identifiers 128 as a destination network identifier.

In this manner, the new firewall rules may be generated.

It is further understood that, in some examples, the new firewall rules may all comprise allow firewall rules (e.g. and exclude deny firewall rules) such that any network traffic that does not meet a new firewall rule is denied.

In the observation mode, the one more computing devices 102 generally accepts or denies respective new firewall rules. In some examples, the one or more computing devices 102 may implement machine learning algorithms and/or neural networks, and the like, trained to accept or deny firewall rules. The machine learning algorithms and/or neural networks, and the like, may be trained using the map 124 and/or historical data (not depicted) of prior acceptance and/or denial of firewall rules at other instances of the application 104 in the system 100, and/prior acceptance and/or denial of firewall rules of other applications deployed in the system 100.

In yet further examples, the one more computing devices 102 may accept or deny respective new firewall rules via input received via an input device, described in more detail below.

In yet further examples, the one or more computing devices 102 may accept or deny respective new firewall rules by providing the new firewall rules to the acceptance device 114 which may implement machine learning algorithms and/or neural networks, and the like, trained to accept or deny firewall rules, and which may be trained using the map 124 and/or historical data (not depicted) of prior acceptance and/or denial of firewall rules at other instances of the application 104 in the system 100, and/prior acceptance and/or denial of firewall rules of other applications deployed in the system 100. In yet further examples, the acceptance device 114 may accept or deny respective new firewall rules via input received via an input device, described in more detail below. Regardless, in these examples, the acceptance device 114 may provide an indication and/or indications of such acceptance or denial to the one or more computing devices 102.

The one or more computing devices 102 may switch the application 104 and the firewall engine 106 from the observation mode to the maintain mode by: stopping implementing the predefined firewall rules; and implementing accepted new firewall rules for the application 104 and/or the firewall engine 106. It is further understood that, in some examples, the new firewall rules may all comprise allow firewall rules (e.g. and exclude deny firewall rules) such that any network traffic that does not meet a new firewall rule is denied.

The common rules 123 may continue to be implemented before the new firewall rules; presuming that the common rules 123 are all "allow" rules, network traffic that meets an "allow" common rule 123 is allowed, and network traffic that does not meet any of the "allow" common rules 123 is compared to the accepted new firewall rules.

In this manner, firewall rules at the firewall engine 106 may be provisioned.

Figure 2:
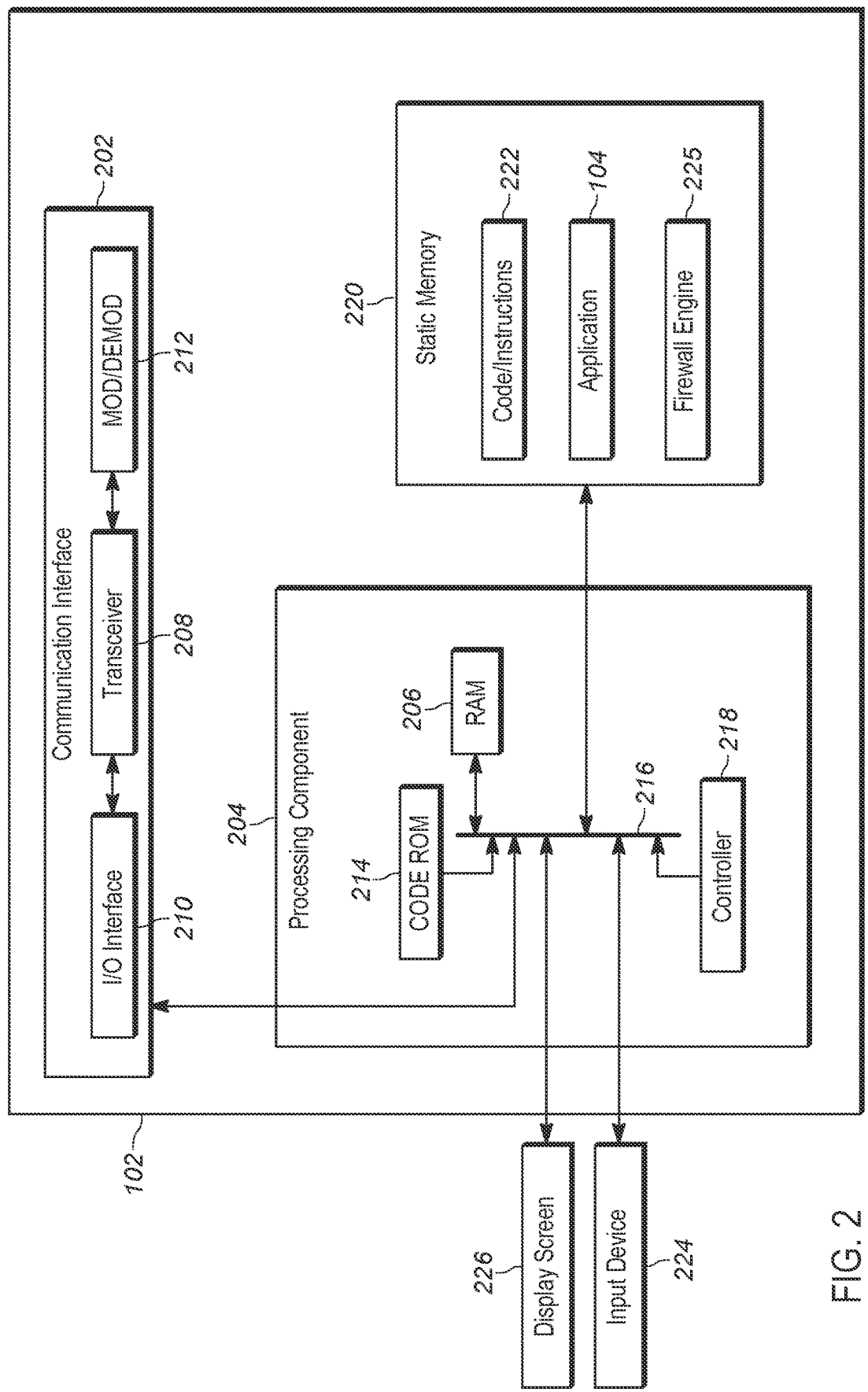
FIG. 2 is a device diagram showing a device structure of a communication device for provisioning firewall engines, in accordance with some examples.

Attention is next directed to FIG. 2, which depicts a schematic block diagram of an example of an example computing device 102 of the one or more computing devices 102. Hence, while the computing device 102 is depicted in FIG. 2 as a single component, functionality of the computing device 102 may be distributed among a plurality of components and the like including, but not limited to, any suitable combination of one or more computing devices 102 and/or one or more servers, and/or one or more cloud computing devices, and the like.

As depicted, the computing device 102 comprises: a communication interface 202, a processing component 204, a Random-Access Memory (RAM) 206, one or more wireless transceivers 208 (e.g., which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one set of code and/or instructions 222. Furthermore, while the memories 206, 214 are depicted as having a particular structure and/or configuration, (e.g., separate RAM 206 and ROM 214), memory of the computing device 102 may have any suitable structure and/or configuration.

As depicted, the computing device 102 may comprise and/or be in communication with one or more of an input device 224 and a display screen 226. While as depicted the input device 224 and the display screen 226 are external to the computing device 102 (e.g. and in communication with the controller 218 via the common data and address bus 216), in other examples, the computing device 102 may comprise the input device 224 and the display screen 226. Furthermore, while as depicted the input device 224 and the display screen 226 in communication with the controller 218 via the common data and address bus 216, in other examples, the input device 224 and the display screen 226 may be remote from the computing device 102 and in communication with the computing device via the communication interface 202.

As shown in FIG. 2, the computing device 102 includes the communication interface 202 communicatively coupled to the common data and address bus 216 of the processing component 204.

The processing component 204 may include the code Read Only Memory (ROM) 214 coupled to the common data and address bus 216 for storing data for initializing system components. The processing component 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100.

For example, the communication interface 202 may include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network including, but not limited to, the Internet. The transceiver 208 may also be coupled to a combined modulator/demodulator 212.

In other examples, the one or more transceivers 208 may be adapted for wireless communication with one or more of the Internet, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless network.

The controller 218 may include ports (e.g., hardware ports which may be different from the software ports referred to herein over which network traffic is communicated for the application 104) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for provisioning firewall engines. For example, in some examples, the computing device 102 and/or the controller 218 specifically comprises a computer executable engine configured to implement functionality for provisioning firewall engines. It is understood that such provisioning for firewall engines includes, but it not limited to, provisioning firewall rules policies at a firewall engine.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

Figure 3:
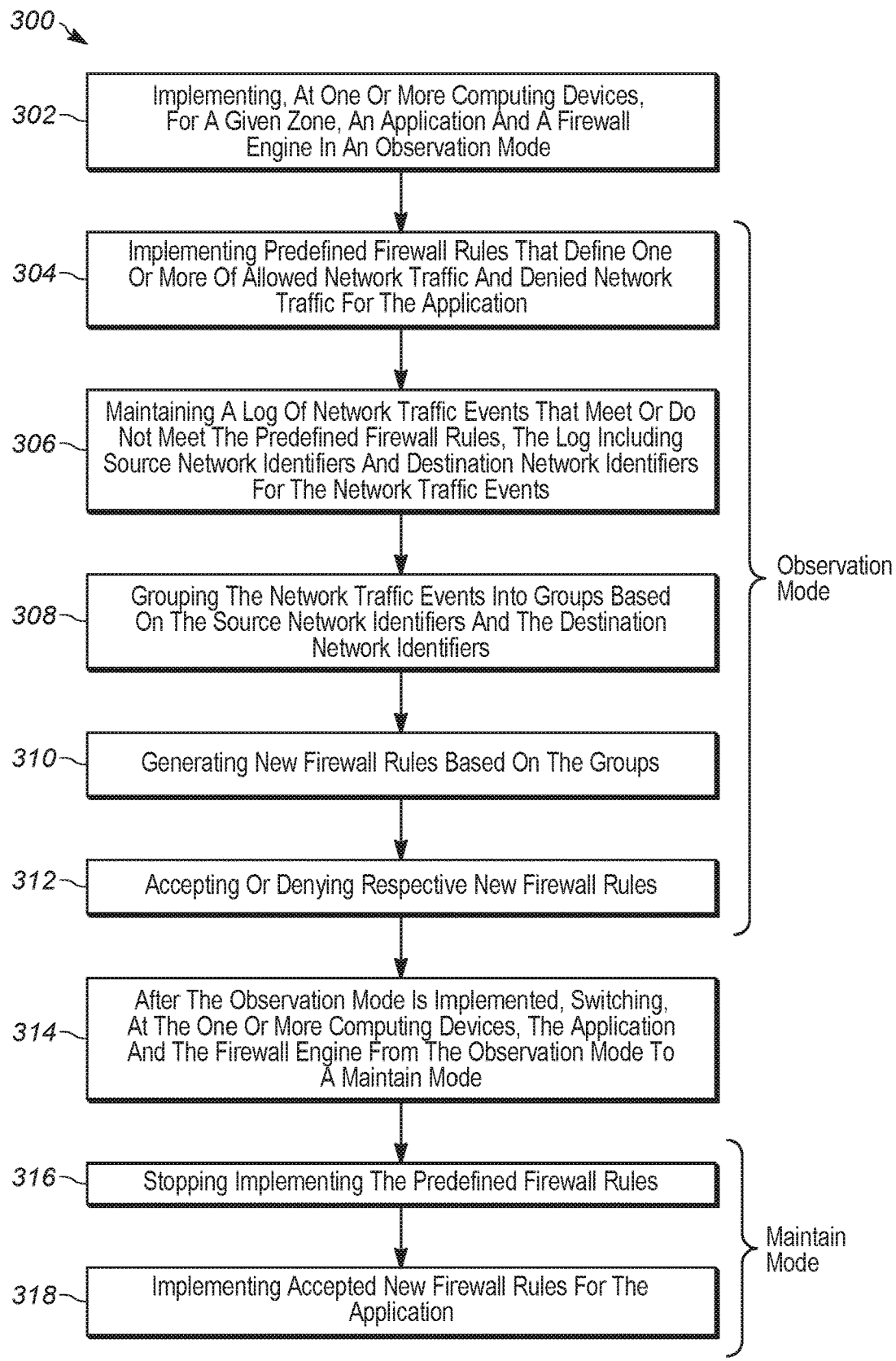
FIG. 3 is a flowchart of a method for provisioning firewall engines, in accordance with some examples.

In particular, the memory 220 stores the instructions 222 that, when executed by the controller 218, enables the controller 218 to implement functionality for provisioning firewall engines, including but not limited to, the blocks of the method set forth in FIG. 3.

The instructions 222 may include programmatic algorithms, and the like, to implement functionality as described herein. Alternatively, and/or in addition to numerical algorithms, the instructions 222 may include machine learning models and/or algorithms, and the like, which have been trained to implement functionality for provisioning firewall engines. Furthermore, the instructions 222 may be operated in a training mode to train machine learning models and/or algorithms thereof to implement functionality for provisioning firewall engines.

The one or more machine learning models and/or algorithms of the instructions 222 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

As depicted, the memory 220 further stores the application 104 and instructions 225 for implementing the firewall engine 106.

While details of the computing devices 110, 112, 114 are not depicted, the computing devices 110, 112, 114 may have components similar to the computing device 102 adapted, however, for the functionality thereof.

For example, the acceptance device 114 may comprise instructions for accepting or denying firewall rules, and/or the acceptance device 112 may comprise, and/or be in communication with, a respective input device and display screen, similar to the input device 224 and the display screen 226.

Attention is now directed to FIG. 3, which depicts a flowchart representative of a method 300 for provisioning firewall engines. The operations of the method 300 of FIG. 3 correspond to machine readable instructions that are executed by the one or more computing devices 102, and specifically the controller 218 (and/or respective controller 218) of the one or more computing devices 102. In the illustrated example, the instructions represented by the blocks of FIG. 3 are stored at the memory 220 for example, as the instructions 222. The method 300 of FIG. 3 is one way that the controller 218 and/or the one or more computing devices 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

Furthermore, while the method 300 is described with respect to being implemented by the computing device 102 depicted in FIG. 2, it is understood that the method 300 may be implemented by one or more computing devices 102.

At a block 302, the controller 218, and/or the computing device 102, implements, for a given zone, the application 104 and the firewall engine in an observation mode. For example, the given zone may be "Zone 1" described with reference to FIG. 1.

In particular, block 304, block 306, block 308, block 310 and block 312, described hereafter, are understood to be implemented in the observation mode.

At a block 304, the controller 218, and/or the computing device 102 implements predefined firewall rules that define one or more of allowed network traffic and denied network traffic for the application 104.

In some examples, at, or prior to the block 304, the controller 218 and/or the computing device 102 may provision the predefined firewall rules by: receiving (e.g. from the provisioning device 112) the generic versions 116 of the predefined firewall rules that include the placeholder fields 120, 122 for respective source network identifiers and respective destination network identifiers; and generate the predefined firewall rules from the generic versions 116 by replacing the placeholder fields 120, 122 with the respective source network identifiers and the respective destination network identifiers for the given zone.

As has been previously described, the placeholder fields 120, 122 may be populated using the map 124; for example, the controller 218 and/or the computing device 102 may request the map 124 from the provisioning device 112, and/or communicate with the provisioning device 112, to populate the placeholder fields 120, 122 based on data from the map 124 provided by the provisioning device 112

However, in other examples, the controller 218 and/or the computing device 102 may receive the predefined firewall rules from the provisioning device 112 which populates the placeholder fields 120, 122 prior to providing the predefined firewall rules to the controller 218 and/or the computing device 102.

At a block 306, the controller 218, and/or the computing device 102 maintains a log of network traffic events that meet or do not meet the predefined firewall rules, the log including source network identifiers and destination network identifiers for the network traffic events.

In particular, once the predefined firewall rules are provisioned at the firewall engine 106, the application 104 and the firewall engine 106 are implemented such that the application 104 performs respective functionality, and the firewall engine 106 generally controls inbound and outbound network traffic according to the predefined firewall rules, however any network traffic that does not meet the predefined firewall rules is allowed.

The controller 218, and/or the computing device 102 generally generates an entry into the log for each network traffic event which is allowed or denied and/or for each network traffic event that meets or does not meet the predefined firewall rules. An entry into the log may indicate one or more source network identifiers and one or more destination network identifiers, such as IP addresses associated with the application 104 and IP addresses of one or more of the devices 108 of a network traffic event.

At a block 308, the controller 218, and/or the computing device 102 groups the network traffic events into groups based on the source network identifiers and the destination network identifiers.

For example, the controller 218, and/or the computing device 102 may group the network traffic events into groups based on the source network identifiers and the destination network identifiers by: associating one or more of respective source zones and respective source subnets with the source network identifiers and associating one or more of respective destination zones and respective destination subnets with the destination network identifiers; and combining the network traffic events that have one or more of like source zones and like source subnets, and one or more of like destination zones and like destination subnets.

In some examples, the associating the one or more of the respective source zones and the respective source subnets with the source network identifiers, and the associating the one or more of the respective destination zones and the respective destination subnets with the destination network identifiers occurs at least partially using the predefined map 124 of one or more of zones and subnets of a network with which the application is communicating.

At a block 310, the controller 218, and/or the computing device 102 generates new firewall rules based on the groups.

For example, a new firewall rule may be generated when a grouping comprises at least a threshold number of network traffic events (e.g. the threshold number of traffic events may be 2, 3, 4 and/or any other suitable number). Furthermore, such thresholds may be particular to respective zones.

However, in some examples, a new firewall rule may be generated from as few as one network traffic event in a group. Put another way, a new firewall rule may comprise a "stand-alone" rule and may appear similar to, and/or the same as, a firewall rule represented by a single network traffic event stored in the log.

Furthermore, each group that corresponds to allowed network traffic may result in a new firewall rule.

For example, a new firewall rule may comprise respective indications of source zones and destination zones for allowed network traffic, for example as indicated in the groups.

In further examples, all the new firewall rules may define respective allowed network traffic such that, in the maintain mode (e.g. described in more detail below), any network traffic that does not meet a new firewall rule is denied.

At a block 312, the controller 218, and/or the computing device 102 accepts or denies respective new firewall rules.

In some examples, accepting or denying the respective new firewall rules may comprise accepting or denying a new firewall rule using one or more machine learning algorithms, and the like, trained to accept or deny a new firewall rule. Such implementation of one or more machine learning algorithms may occur at the computing device 102 and/or the acceptance device 114. For example, as the acceptance device 114 may have more processing resources available and/or the acceptance device 114 may be dedicated to accepting or denying new firewall rules, the computing device 102 may provide a new firewall rule to the acceptance device 114, which may process the new firewall rule using one or more machine learning algorithms, and provide an indication of acceptance or denial to the computing device 102, which responsively accepts or denies the new firewall rule.

In some examples, accepting or denying the respective new firewall rules may comprise: rendering, at a display screen (e.g. the display screen 226 and/or a display screen associated with the acceptance device 114), the groups including respective indications of source zones and destination zones associated with the source network identifiers and the destination network identifiers; rendering, at the display screen, with the groups, respective electronic buttons for selecting groups indicative of respective new firewall rules; and accepting or denying a respective new firewall rule based on selection of an electronic button for a respective group.

In some examples, selection of an electronic button may occur via an input device, such as the input device 224 and/or an input device associated with the acceptance device 114.

In further examples, accepting or denying the respective new firewall rules comprises: providing, to the acceptance device 114, an indication of a respective new firewall rule; receiving, from the acceptance device 114, an acceptance or a denial of the respective new firewall rule; and accepting or denying the respective new firewall rule based on the acceptance or the denial received from the acceptance device 114.

In yet further examples, the acceptance or denial of the new firewall rules may be performed as a two-step process, in which acceptance or denial of the new firewall rules first occurs at the computing device 102, and new firewall rules which are accepted by the computing device 102 are provided to the acceptance device 114, which may accept or deny the new firewall rules which were accepted by the computing device 102. The acceptance device 114 provides an indication of such acceptance or denial back to the computing device 102.

At a block 314, the controller 218, and/or the computing device 102, switches the application 104 and the firewall engine 106 from the observation mode to a maintain mode.

In particular, block 316 and block 318, described hereafter, are understood to be implemented in the maintain mode.

At a block 316, in the maintain mode, the controller 218, and/or the computing device 102 stops implementing the predefined firewall rules.

At a block 318, the controller 218, and/or the computing device 102 implements accepted new firewall rules for the firewall engine 106. As mentioned previously, the new firewall rules may comprise "allow" firewall rules such that any network traffic that does not meet the new firewall rules is denied.

However, it is understood that the common rules 123 may also be implemented in the maintain mode such that any network traffic that does not meet the new firewall rules or "allow" common rules 123 is denied.

Furthermore, in the maintain mode, the new firewall rules may be implemented in any given order, and the common rules 123 may be implemented after or before the new firewall rules.

For example, in the maintain mode, when the allow common rules 123 are implemented after the new firewall rules, and when given network traffic meets a first "allow" new firewall rule that is higher in the given order (e.g., than a second new firewall rule), the given network traffic is allowed, and the given network traffic is no longer compared to any remaining new firewall rules in the given order. However, when given network traffic does not meet the first "allow" new firewall rule, the given network traffic is compared to subsequent new "allow" firewall rules; when the given traffic does not meet any of the new "allow" firewall rules, the given network traffic is denied, unless the given network traffic meets one of the allow common rules 123.

When the allow common rules 123 are implemented before the new firewall rules, when given network traffic meets an allow common rule 123, the given traffic is allowed and is not compared to the new firewall rules. However, when given network traffic does not meet the allow common rules 123, the given traffic is compared to the new firewall rules in the given order, as described above.

Hence, in the given order, the common rules 123 may be implemented first or last.

In some examples, the observation mode may be implemented for a given time period, and the controller 218, and/or the computing device 102 may switch the application 104 and the firewall engine 106 to the maintain mode after the given time period. Such a given time period may be for one week, two weeks, amongst other possibilities, and/or the given time period may be determined heuristically and provisioned in the system 100 accordingly. In these examples, the new firewall rules may be generated on an on-going basis (e.g. as groupings occur) and/or at the end of the given time period.

Furthermore, as has been described, in the observation mode, the predefined firewall rules may be implemented in a given order. In these examples, new firewall rules may be accepted or denied on an on-going basis, as groups and respective new firewall rules are generated. In some of these examples, as the new firewall rules are accepted, the new firewall rules may be implemented, for example before the predefined firewall rules in the given order (and after the common rules 123). Indeed, in these examples, when network traffic meets a new firewall rule, a corresponding network traffic event may not be stored in the log.

Hence, by implementing the new firewall rules before the predefined firewall rules in the observation mode, similar network traffic that had previously met a predefined firewall rule may meet the new predefined firewall rule and may not be compared to the predefined firewall rule, which leads to a reduction in the network traffic events in the log. Eventually, in some examples, as new firewall rules are generated and implemented in the observation ode, no new network traffic events may appear in the log.

Hence, in some of these examples, when no further new firewall rules are generated and accepted after one or more of the new firewall rules are implemented in the given order, the controller 218 and/or the computing device 102 may switch the application 104 and the firewall engine 106 from the observation mode to the maintain mode. In particular, and put another way, in these examples, as the new firewall rules are implemented before the predefined firewall rules, network traffic may meet a new firewall rule and the corresponding network traffic events are not maintained in the log. After some period of time, no new firewall rules may be generated and/or no new network traffic events may appear in the log, as the application 104 has generally communicated with all the devices 108 with which the application 104 has network dependencies, and/or vice versa. Hence, in some of these examples, the controller 218 and/or the computing device 102 may start a timer, and the like, (e.g. using a clock of the processing component 204, not depicted) when a new firewall rule is generated, and when the timer reaches a threshold time (e.g. such as 1 hour, 2 hours, 1 day, 2 days, 1 week, 2 weeks, amongst other possibilities) without another new firewall rule being generated and accepted, and/or without any new network traffic events being maintained in the log, the controller 218 and/or the computing device 102 may switch the application 104 and the firewall engine 106 to the maintain mode.

In yet further examples, in the observation mode, the controller 218 and/or the computing device 102 may be further configured to request acceptance, using an input device (e.g. such as the input device 224 and/or an input device associated with the acceptance device 114), for new firewall rules that result from a grouping of a number of network events that are less than a threshold number of network events (e.g. and such a threshold number may be 2, 3, amongst other possibilities) and/or for network events that include a source network identifier or a destination network identifier that is not indicated by the map 124. For example, a device that is not associated with an entity associated with the system 100 (e.g. an associated network identifier may not be indicated by the map 124) may attempt to access the application 104, and such a device may be operated by a bad actor, and the like. As such a network event may be a one-time network event, and/or as a network identifier associated with such a device may not be indicated by the map 124, the controller 218 and/or the computing device 102 may be configured to require that acceptance of a resulting new firewall rule (e.g. that may allow network traffic from such a device) occur via an input device.

Similarly, in the observation mode, the controller 218 and/or the computing device 102 may be configured to prevent dedicated denial of service (DDOS) attacks, for example by controlling the firewall engine 106 to deny instances of network traffic that is received from one or more devices associated with destination network identifiers not indicated by the map 124, within a given time period (e.g. such as 30 seconds, 1 minute, 5 minutes, amongst other possibilities) and/or which reaches a threshold network volume. Put another way, in the observation mode, when network traffic from devices that are not identified by the map 124 reaches a threshold network volume within a given time period, one or more new firewall rules denying such network traffic may be generated and implemented by the firewall engine 106, such that similar network traffic is thereafter denied. However, in other examples, any suitable DDOS prevention scheme may be implemented at the firewall engine 106, independent of the provisioning thereof as described herein.

Figure 4:
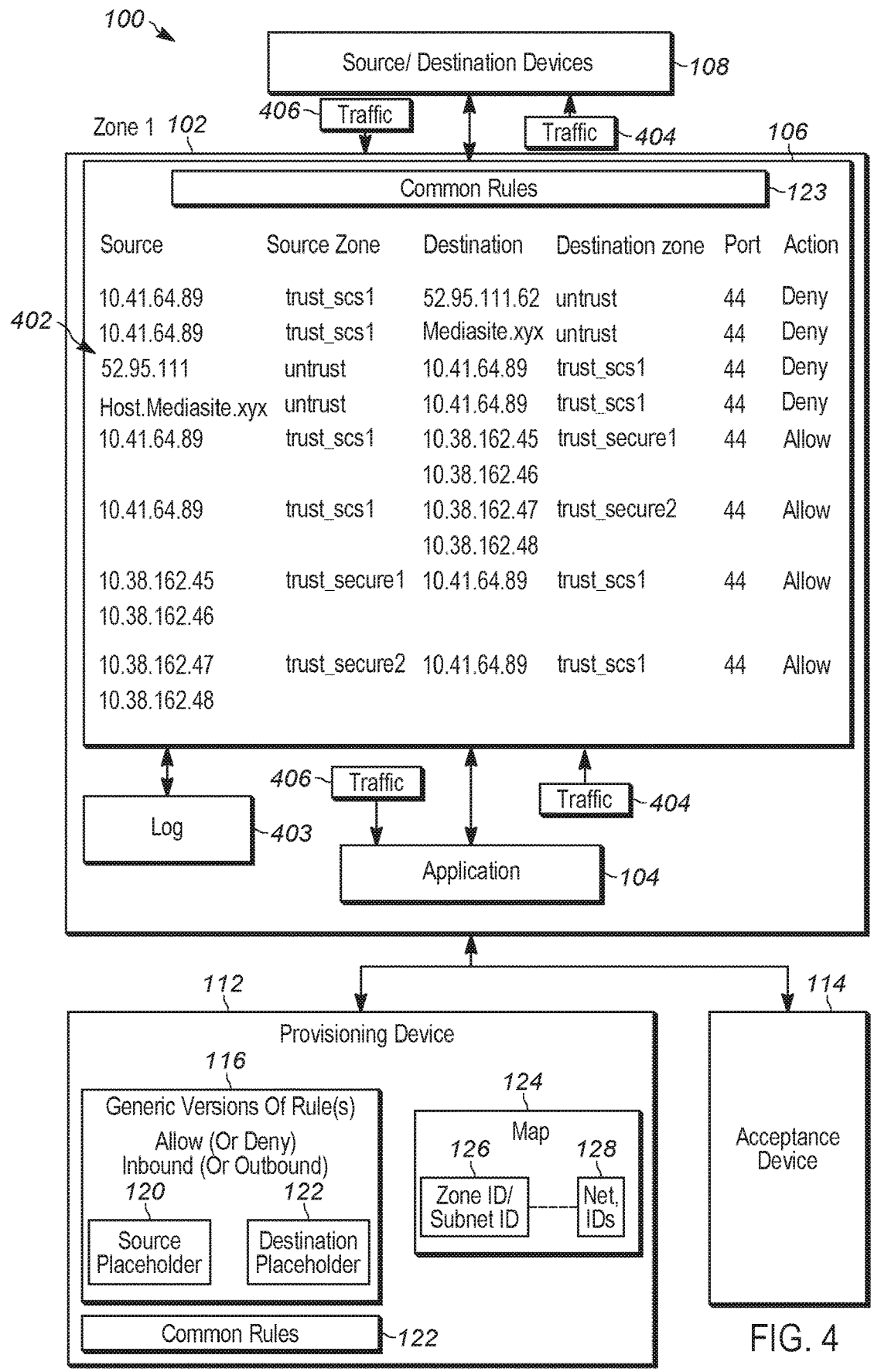
FIG. 4 depicts a portion of the system of FIG. 1 with a computing device in an observation mode and implementing predefined firewall rules, in accordance with some examples.
Figure 6:
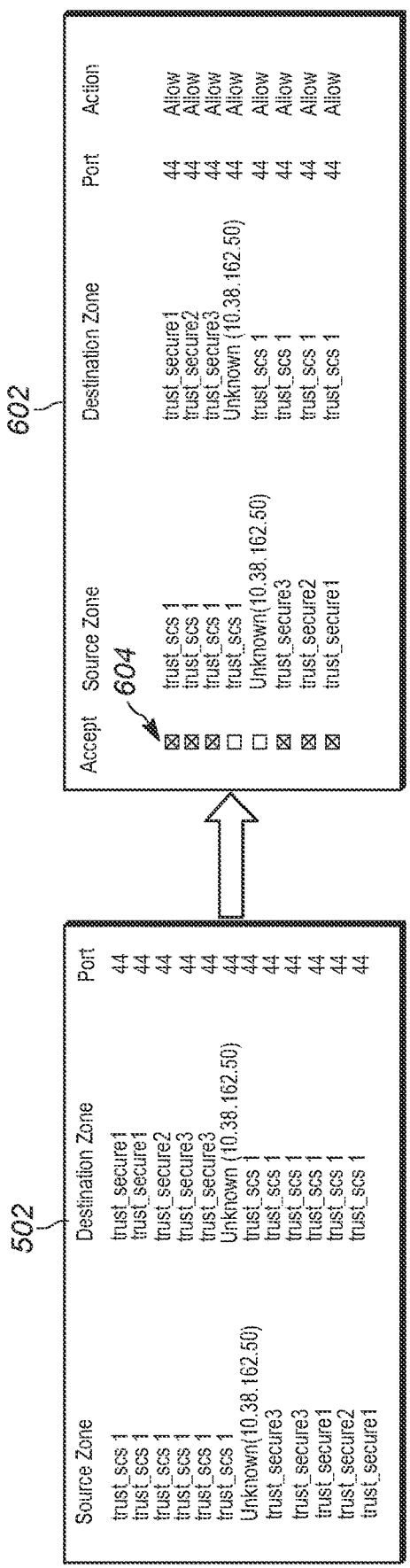
FIG. 6 depicts an example of groupings that occur by the computing device in the observation mode, as well as acceptance or denial of associated new firewall rules, in accordance with some examples.
Figure 7:
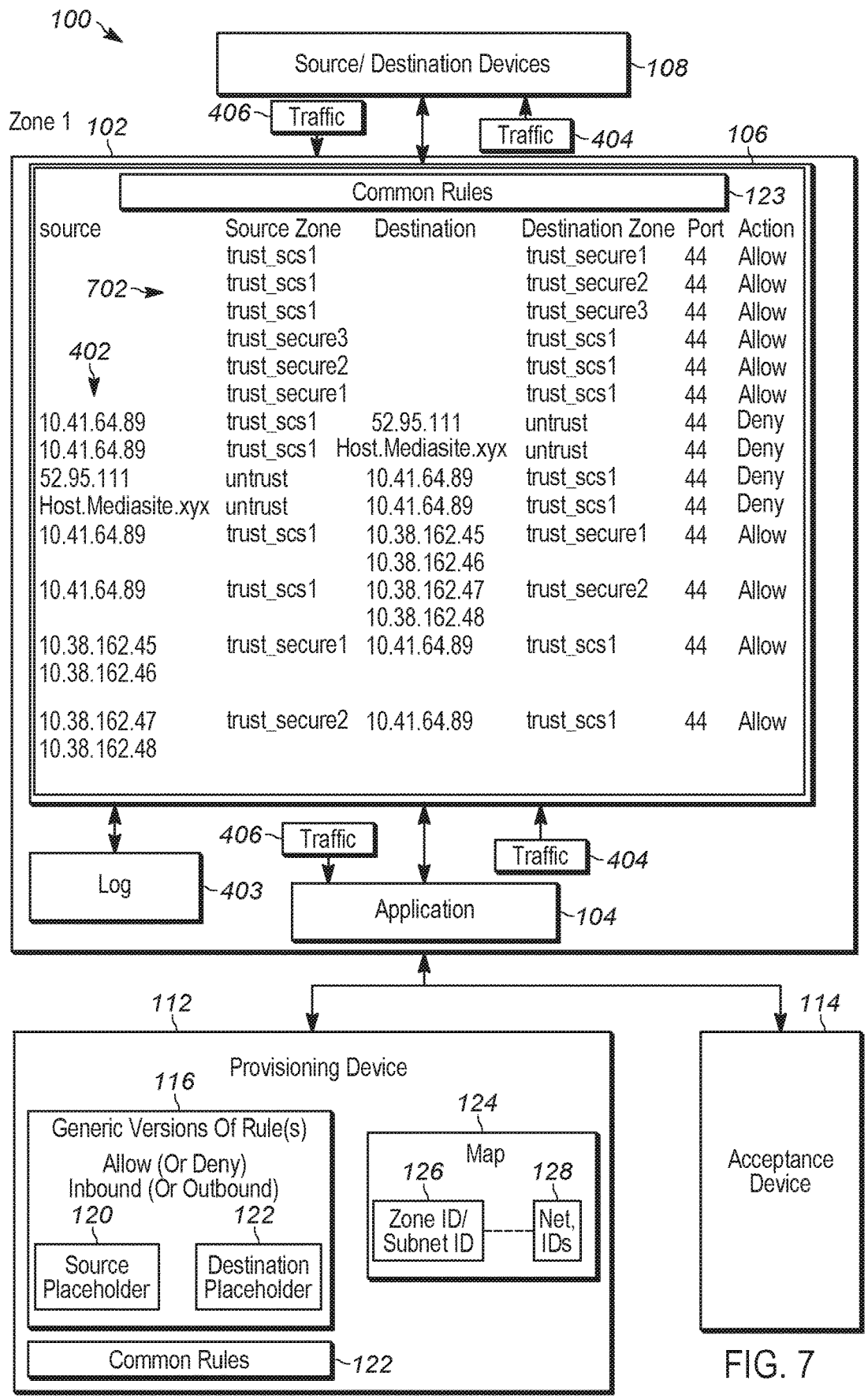
FIG. 7 depicts a portion of the system of FIG. 1 with the computing device in an observation mode and implementing the new firewall rules along with predetermined firewall rules, in accordance with some examples.
Figure 8:
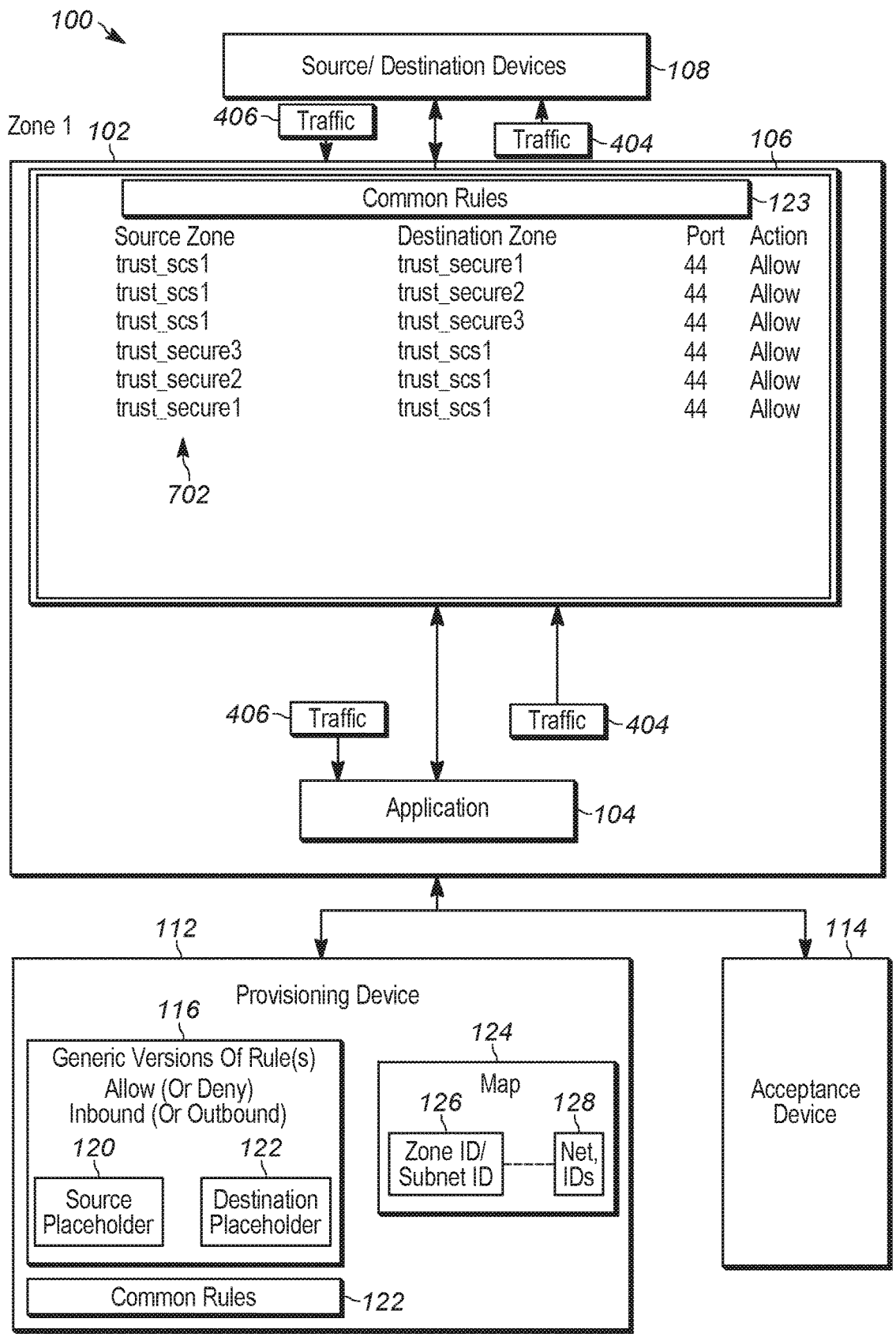
FIG. 8 depicts a portion of the system of FIG. 1 with the computing device switching to a maintain mode, stopping implementing the predetermined firewall rules, and implementing the new firewall rules, in accordance with some examples.
Figure 9:
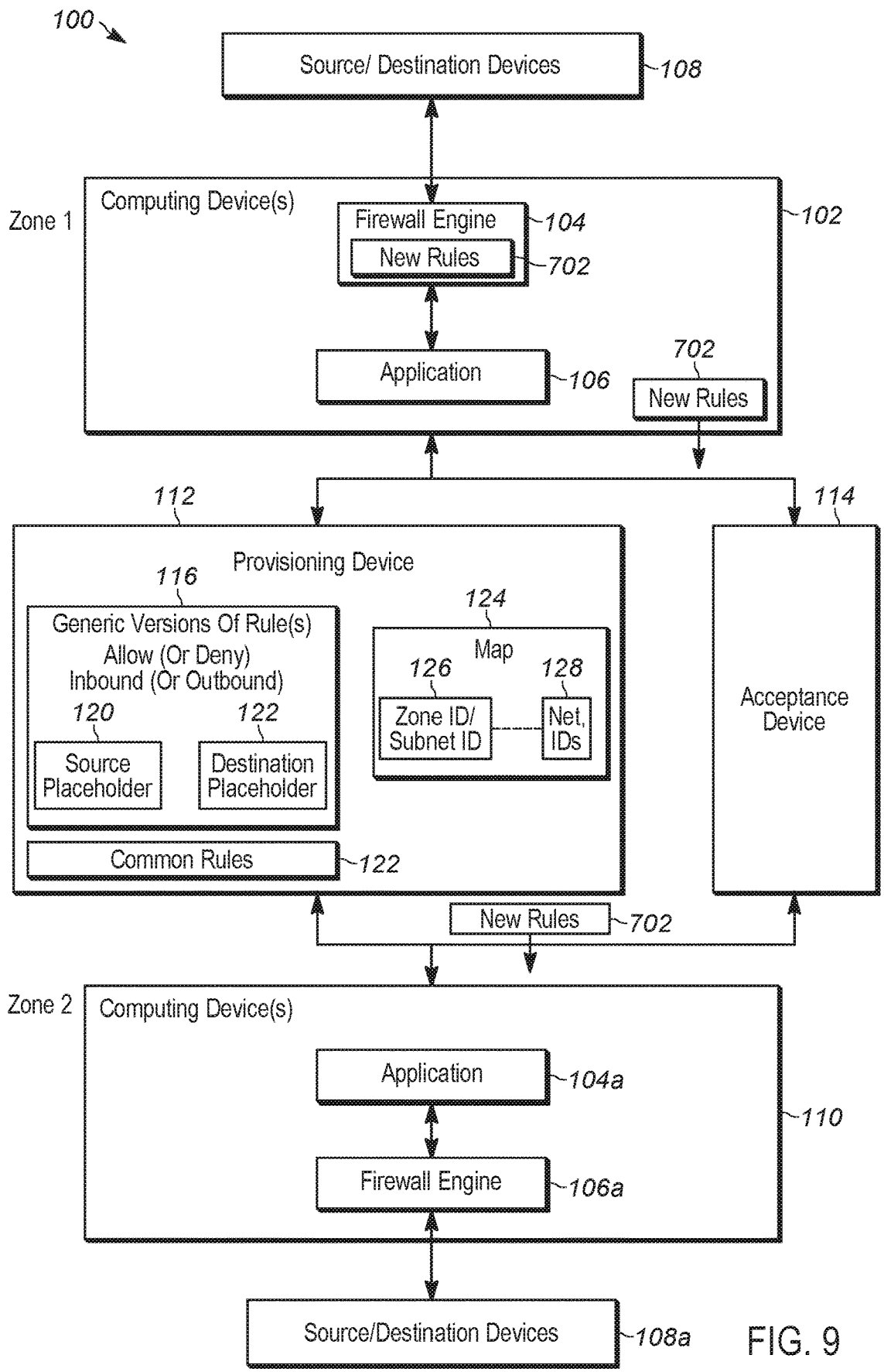
FIG. 9 depicts the computing device in the system of FIG. 1, sharing the new firewall rules, in accordance with some examples.

Attention is next directed to FIG. 4, FIG. 5, FIG. 6, FIG. 7. FIG. 8 and FIG. 9 which depict an example of the method 300. FIG. 4. FIG. 7. FIG. 8 and FIG. 9 are similar to FIG. 1, with like components having like numbers; however, in FIG. 4, FIG. 7 and FIG. 8, for simplicity, the components associated with Zone 2 are not depicted, though they are nonetheless understood to be present.

Attention is first directed to FIG. 4, which depicts the computing device 102 implementing (e.g. at the block 302 of the method 300) the observation mode. As depicted, the computing device 102 has received the generic versions 116 of the predefined firewall rules and populated the placeholder fields 120, 122 using, for example, the map 124 (e.g. an example of which is shown in FIG. 5). As such, the computing device 102 is implementing (e.g. at the block 304 of the method 300) predefined firewall rules 402, for example at the firewall engine 106, that define allowed network traffic and denied network traffic for the application 104. As depicted, the predefined firewall rules 402 are provided in rows, and include eight rules including four deny rules and four allow rules, as indicated by a column "Actions". As depicted, all the predefined firewall rules 402 are for port "44" (e.g. a software port).

While hereafter the predefined firewall rules 402 are described with respect to alphanumeric names zones it is understood that such alphanumeric names may alternatively identify a subnet.

The deny rules include two outbound deny rules that identify an IP address of the application 104 (e.g. 10.41.64.89) as a source, and an alphanumeric name of a zone associated with the application 104 (e.g. trust_scs1) as a source zone. A first outbound deny rule further identifies an IP address and a respective destination zone of a destination device 108 to which network traffic is denied (e.g. respectively 52.95.111.62, unknown); in particular as an IP address of the destination device 108 may be identified by the map 124, but as the zone of the destination device 108 may not be identified by the map 124, the zone of the destination device 108 is indicated as being "unknown".

Similarly, a second outbound deny rule further identifies an FQDN and a respective destination zone of a destination device 108 to which network traffic is denied (e.g. respectively "Host.Mediasite.xyx, unknown"); in particular an FQDN of the destination device 108 (e.g. a webserver) may be identified by the map 124, but as the zone of the destination device 108 may not be identified by the map 124, the zone of the destination device 108 is indicated as being "unknown".

The deny rules include two inbound deny rules that identify the IP address of the application 104 as a source, and the alphanumeric name of the zone associated with the application 104 as a source zone. The source/source zones of the two inbound deny rules are respectively the same as the destination/destination zones of the two outbound deny rules.

The allow rules include two outbound allow rules that identify an IP address of the application 104 as a source, and an alphanumeric name of the zone associated with the application 104 as a source zone.

A first outbound allow rule further identifies IP addresses and a respective destination zone of a set of destination devices 108 to which network traffic is allowed (e.g. respectively 10.38.162.45, 10.38.162.46, and trust_secure1). It is understood that all the destination devices 108 identified by the IP addresses may be associated with the identified destination zone by the map 124.

A second outbound allow rule further identifies IP addresses and a respective destination zone of another set of destination devices 108 to which network traffic is allowed (e.g. respectively 10.38.162.47, 10.38.162.48, and trust_secure2). Similar to the first outbound allow rule, it is understood that all the destination devices 108 identified by the IP addresses may be associated with the identified destination zone by the map 124.

The allow rules include two inbound allow rules that identify the IP address of the application 104 as a source, and the alphanumeric name of the zone associated with the application 104 as a source zone. The source/source zones of the two inbound allow rules are respectively the same as the destination/destination zones of the two outbound allow rules.

While the depicted predefined firewall rules 402 do not show a type of respective network traffic that is to be allowed or denied, in other examples, a predefined firewall rule 402 may be to allow or deny specific types of network traffic, for example according to give protocols. For example one predefined firewall rule 402 may be to allow network traffic that occurs according to the SSH protocol (e.g. and for a specific source or destination), while another predefined firewall rule 402 may be to deny network traffic that occurs according to the FTP protocol (e.g. and for a specific source or destination).

It is generally understood that the depicted predefined firewall rules 402 may be implemented in the depicted given order, which may be defined by an order of the corresponding generic versions 116. Furthermore, the common rules 123 are implemented before the predefined firewall rules 402 in the depicted given order.

Furthermore, as depicted, outbound network traffic 404 and inbound network traffic 406 are filtered, and the like, by the firewall engine 106 using the predefined firewall rules 402 (and the common rules 123) such that outbound network traffic 404 that meets an outbound deny rule is denied, inbound network traffic 406 that meets an inbound deny rule is denied, outbound network traffic 404 that meets an outbound allow rule is allowed, inbound network traffic 406 that meets an inbound allow rule is allowed. As described herein, network traffic 404, 406 is compared to the predefined firewall rules 402 in the given order, such that when network traffic 404, 406 meets a predefined firewall rule 402 that is higher in the given order than another predefined firewall rule 402, that network traffic 404, 406 is allowed or denied accordingly and not compared to others of the predefined firewall rules 402.

Furthermore, it is understood that network traffic 404, 406 that does not meet any of the predefined firewall rule 402 (or any "allow" common rules 123) is generally allowed.

As further described herein, in the observation mode, the computing device 102 maintains (e.g. at the block 306 of the method 300), a log 403 of network traffic events that meet or do not meet the predefined firewall rules 402, the log 403 including source network identifiers and destination network identifiers for the network traffic events.

For example, attention is next directed to FIG. 5, which depicts an example of the log 403, an example of the map 124, and an example of the block 308 of the method 300.

In particular, the log 403, as depicted in FIG. 5, shows, in each row, examples of allowed network events, and includes a time and date, a source IP address, a destination IP address and a port (e.g. a software port "44") over which the network event occurred at the application 104. While only allowed network events are depicted for simplicity, the log 403 may include denied network events.

It is understood that the log 403 may be a simplified version thereof, and that the log 403 may include any suitable information associated with network events.

While each network event in the depicted log 403 includes only one source IP address and one destination IP address, a network event may include any suitable number of source IP addresses or destination IP addresses. For example, when a source IP address comprises the IP address associated with the application 104, a network event may include one destination IP address or a plurality of destination IP addresses.

An example of the map 124 is also depicted in FIG. 5, showing zone (and/or subnet) identifiers 126 and respective associated network addresses 128, such as IP addresses of devices 108, or an FQDN of a webserver, and the like. Furthermore, a zone labelled "untrust" is understood to indicate a zone for which inbound and outbound network traffic for associated network identifiers 128 is to be denied, for example at least in the predetermined firewall rules.

As depicted, the map 124 includes a zone "trust-scs1" associated with the IP address of the application 104 (e.g. 10.41.64.89), a zone "trust_secure1" associated with IP addresses of two devices 108 (e.g. 10.38.162.45 and 10.38.162.46), a zone "trust_secure2" associated with IP addresses of another two devices 108 (e.g. 10.38.162.47 and 10.38.162.48) and a zone "trust_secure3" associated with an IP addresses of one device 108 (e.g. 10.38.162.49). It is understood that network traffic for the zones trust-scs1, trust_secure1, trust_secure2 and trust_secure3 may be allowed or denied depending associated rules that is also stored in the map 124. For example, for the zone trust-scs1, network traffic to or from a public webserver is to be denied, but network traffic to or from a webserver internal to the entity associated with the system 100 is to be allowed; while not depicted, the associated rules for the zone trust-scs1 may further indicate whether network traffic of given protocol types is to be allowed or denied. For example, for the zones trust_secure1, trust_secure2, trust_secure3 SSH protocol network traffic is to be allowed, while FTP protocol network traffic is to be denied. Furthermore, such rules may be specific to given application types as described elsewhere herein, such as a type of the application 104 (which, while not depicted may also be stored at the map 124, for example in a project container for the application 104; indeed, the zone "trust-scs1" and the IP address of the application 104 (e.g. 10.41.64.89) may also be stored in such a project container). It is further understood that the label "trust" in an identifier 126 of a zone may merely be a name and does not specifically indicate whether a zone is trusted or not trusted.

Similarly, the zones "untrust" are associated with rules that indicate that all network traffic to and from such zones is to be denied.

It is further understood that such information may be used to populate the placeholder fields 120, 122 that are used to generate the predefined rules 402 described above with respect to FIG. 4. For example, the network addresses 128 for the depicted "unknown" zones may be used to populate the placeholder fields 120, 122 for the inbound and outbound deny rules, and the network addresses 128 for the zones trust_sc1, trust_secure1, trust_secure2 and trust_secure3 may be used to populate the placeholder fields 120, 122 for the inbound and outbound allow rules and deny rules (e.g. depending on a type of protocol associated with a rule and/or a type of webserver). However, in other examples, the placeholder fields 120, 122 may be populated using other information, such as from the aforementioned project container associated with a zone indicated in the map 124, and which may or may not be stored at the map 124. For example, such a project container may comprise information associated with a zone (e.g. such as the network identifiers 128) that may be used to populate the map 124 which may in turn be used to populate the placeholder fields 120, 122, and/or the information of the project container may be used to populate the placeholder fields 120, 122 without use of the map 124.

In particular, it is understood the map 124 may indicate network dependencies between the zones identified by the zone identifiers 126 and/or may group the information according to predetermined network dependencies. For example, the map 124 may indicate that the zones trust-scs1, trust_secure1, trust_secure2 and trust_secure3 are all associated, and the placeholder fields 120, 122 may be populated accordingly.

Furthermore, while the map 124 as depicted indicates information used to populate the placeholder fields 120, 122 for the application 104 deployed in association with Zone 1, the map 124 may include similar information for zones associated with the instance of the application 104a deployed in association with Zone 2, so that when the method 300 is implemented by the computing device 110, the placeholder fields 120, 122 may be populated accordingly. Alternatively, such information may be determined from a project container associated with Zone 2.

As depicted, the log 403 may be processed by the computing device 102 to group (e.g. at the block 308 of the method 300) the network events for example using the map 124. For example, as depicted, in an intermediate processing step of the block 308, as depicted in a table 502, the source IP addresses and the destination IP addresses of the log 403 are replaced with the respective zones indicated by the map 124. For example, the IP address 10.41.64.89 is replaced with "trust_secure1", the IP addresses 10.38.162.45, 10.38.162.46 are replaced with "trust_secure2", and the IP addresses 10.38.162.47, 10.38.162.48 are replaced with "trust_secure3". When an IP address in the log 403 is not indicate by the map 124 (e.g. 10.38.162.50), an associated zone is set as "untrust" (e.g. an unknown IP address not indicated by the map 124). It is understood that the information of the table 502 is depicted in a tabular format merely as an example and that the information may be provided in any suitable format.

Turning now to FIG. 6, the table 502 is processed to group the network events to generate groups 602. For example, in table 502, two outbound network events (e.g. indicated in the first two rows) are associated with a source zone trust-scs1 a destination zone trust-secure 1; hence, in the groups 602, the two outbound network events are replaced with one network event associated with a source zone trust-scs1 a destination zone trust-secure 1. Similar groups are generated for the remainder of the network events indicated by the table 502. Furthermore such groups 602 may be representative of deduplicating network events. In some examples, as previously mentioned, groupings may occur when a number of network events reach or exceed a threshold number, such as 2 network events. Furthermore, such threshold may be particular to respective zones. For example, for the destination zone trust-secure 1, a grouping may occur when two associated network events occur, whereas for the destination zone trust-secure 2, a grouping may occur when one network event occurs.

As depicted, the groups 602 further include an associated software port, and an associated action: as all the groups 602 are understood to be associated with allowed network traffic, the action for each of the groups is "Allow".

As such it is understood that each of the groups 602 correspond to a new firewall rule that is generated (e.g. at the block 310 of the method 300) based on the groups. While FIG. 6 depicts the groups 602 and the new firewall rules being generated together, the in other examples, the groups 602 may be generated first and the new firewall rules generated thereafter.

Similarly, the groups 602 are described as being generated by first replacing network addresses of the log 403 with respective zones from the map 124, and then grouping accordingly, the grouping may occur in any suitable manner.

As depicted, the groups 602 further include respective electronic buttons 604 which, when selected (e.g. via machine learning and/or via an input device, as described herein) indicate that a respective new firewall rule (e.g. corresponding to a group 602) is accepted or denied. For example, as depicted the electronic buttons 604 comprise selection boxes and, when an "X" is in a selection box a respective new firewall rule is understood to be accepted, whereas when an "X" is not in a selection box a respective new firewall rule is understood to be denied.

However, such electronic buttons 604 may be optional, for example when acceptance or denial of the new firewall rules occur via machine learning, and the like. In particular, such electronic buttons 604 may be provided (e.g. on a display screen) with the new firewall rules, and acceptance or denial of the new firewall may occur via an input device selecting the electronic buttons 604.

Regardless, the example of accepting or denying the new firewall rules via the electronic buttons 604, as depicted in FIG. 6, is understood to be an example of the block 312 of the method 300.

In particular, as depicted, the first three and the last three of the new firewall rules represented by the groups 602 are understood to be accepted (e.g. as respective electronic buttons 604 include an "X"), while the fourth and fifth new firewall rules represented by the groups 602 are understood to be denied (e.g. as respective electronic buttons 604 do not include an "X").

Attention is next directed to FIG. 7 which depicts new firewall rules 702 (e.g. represented by the groups 602) being implemented in the observation mode. In particular, the firewall engine 106 is implementing the new firewall rules 702 after the common rules 123 and before the predefined firewall rules 402.

While such an example may continue to allow inbound and outbound network traffic associated with the IP address 10.38.162.50 that was associated with a denied new firewall rule, any new firewall rule that is again generated for the IP address 10.38.162.50 may again be denied.

It is understood that yet further new firewall rules may be generated and accepted, and implemented by the firewall engine 106. However, after a period of time, no new firewall rules may be generated and accepted and the computing device 102 may switch (e.g. at the block 314 of the method 300) the application 104 and the firewall engine 106 to the maintain mode.

For example, attention is next directed to FIG. 8 which depicts the computing device 102 in the maintain mode. In particular, the computing device 102 has stopped (e.g. at the block 316 of the method 300) implementing the predefined firewall rules 402 and is implementing (e.g. at the block 318 of the method 300) the accepted new firewall rules 702. As all the new firewall rules 702 are allow firewall rules, any outbound network traffic 404 and inbound network traffic 406 that does not meet any of the new firewall rules 702 is denied (e.g. other than network traffic that meets an "allow" common rule 123).

Attention is next directed to FIG. 9 which depicts the system 100 with the computing device 102 in the maintain mode. As depicted, the accepted new firewall rules 702 may be shared with other instances of the application 104 and the firewall engine 106, such as the application 104a and the firewall engine 106a being implemented in association with Zone 2. Hence, as depicted, the computing device 102 may provide accepted new firewall rules 702 to one or more of the devices 112, 114, which may forward the accepted new firewall rules 702 to the computing device 110, which may cause the accepted new firewall rules 702 to be implemented at the firewall engine 106a in a maintain mode, with, however, the IP address of the application 104 replaced with the IP address of the application 104a. Such sharing may be useful when network traffic is redirected between instances of the application 104 and the firewall 106, for example when the application 104 fails and/or is overloaded, and/or in any other suitable circumstances.

However, it is further understood that the method 300 may be implemented by the computing device 110, and any new firewall rules that are generated and accepted may be shared with the computing device 102, which may cause the new firewall rules received from the computing device 110 to be implemented in the maintain mode.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive network traffic, operate a firewall engine, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
at one or more computing devices, implementing, for a given zone, an application and a firewall engine in an observation mode by:
implementing predefined firewall rules that define one or more of allowed network traffic and denied network traffic for the application;
maintaining a log of network traffic events that meet or do not meet the predefined firewall rules, the log including source network identifiers and destination network identifiers for the network traffic events;
grouping the network traffic events into groups based on the source network identifiers and the destination network identifiers;
generating new firewall rules based on the groups; and
accepting or denying respective new firewall rules; and,
after the observation mode is implemented, switching, at the one or more computing devices, the application and the firewall engine to a maintain mode by:
stopping implementing the predefined firewall rules; and
implementing accepted new firewall rules for the application.

2. The method of claim 1, wherein the observation mode is implemented for a given time period, and switching the application and the firewall engine to the maintain mode occurs after the given time period.

3. The method of claim 1, wherein the predefined firewall rules are implemented in a given order in the observation mode, and the method further comprises, in the observation mode:
as the new firewall rules are accepted, implementing the new firewall rules after the predefined firewall rules in the given order; and
when no further new firewall rules are generated and accepted after one or more of the new firewall rules are implemented in the given order, switching the application and the firewall engine from the observation mode to the maintain mode.

4. The method of claim 1, further comprising:
receiving generic versions of the predefined firewall rules that include placeholder fields for respective source network identifiers and respective destination network identifiers; and
generating the predefined firewall rules from the generic versions by replacing the placeholder fields with the respective source network identifiers and the respective destination network identifiers for the given zone.

5. The method of claim 1, wherein grouping the network traffic events into groups based on the source network identifiers and the destination network identifiers comprises:
associating a respective source zones with the source network identifiers and associating a respective destination zone with the destination network identifiers; and
combining the network traffic events that have like source zones and like destination zones.

6. The method of claim 5, wherein the associating the respective source zones with the source network identifiers and the associating the respective destination zone with the destination network identifiers occurs at least partially using a predefined map of zones of a network with which the application is communicating.

7. The method of claim 1, wherein a new firewall rule comprises respective indications of source zones and destination zones for allowed network traffic.

8. The method of claim 1, wherein all the new firewall rules define respective allowed network traffic such that, in the maintain mode, any network traffic that does not meet a new firewall rule is denied.

9. The method of claim 1, wherein accepting or denying the respective new firewall rules comprises:
rendering, at a display screen, the groups including respective indications of source zones and destination zones associated with the source network identifiers and the destination network identifiers;
rendering, at the display screen, with the groups, respective electronic buttons for selecting groups indicative of respective new firewall rules; and
accepting or denying a respective new firewall rule based on selection of an electronic button for a respective group.

10. The method of claim 1, wherein accepting or denying the respective new firewall rules comprises:
providing, to an acceptance device, an indication of a respective new firewall rule;
receiving, from the acceptance device, an acceptance or a denial of the respective new firewall rule; and
accepting or denying the respective new firewall rule based on the acceptance or the denial received from the acceptance device.

11. A device comprising:
a controller configured to:
implement, for a given zone, an application and a firewall engine in an observation mode by:
implementing predefined firewall rules that define one or more of allowed network traffic and denied network traffic for the application;
maintaining a log of network traffic events that meet or do not meet the predefined firewall rules, the log including source network identifiers and destination network identifiers for the network traffic events;
grouping the network traffic events into groups based on the source network identifiers and the destination network identifiers;
generating new firewall rules based on the groups; and
accepting or denying respective new firewall rules; and
after the observation mode is implemented, switch the application and the firewall engine to a maintain mode by:
stopping implementing the predefined firewall rules; and,
implementing accepted new firewall rules for the application.

12. The device of claim 11, wherein the controller is further configured to:
implement the observation mode for a given time period; and
switch the application and the firewall engine to the maintain mode after the given time period.

13. The device of claim 11, wherein the controller is further configured to:
in the observation mode, implement the predefined firewall rules in a given order;

in the observation mode, as the new firewall rules are accepted, implement the new firewall rules after the predefined firewall rules in the given order; and when no further new firewall rules are generated and accepted after one or more of the new firewall rules are implemented in the given order, switch the application and the firewall engine from the observation mode to the maintain mode.

14. The device of claim 11, wherein the controller is further configured to:

receive generic versions of the predefined firewall rules that include placeholder fields for respective source network identifiers and respective destination network identifiers; and generate the predefined firewall rules from the generic versions by replacing the placeholder fields with the respective source network identifiers and the respective destination network identifiers for the given zone.

15. The device of claim 11, wherein the controller is further configured to group the network traffic events into groups based on the source network identifiers and the destination network identifiers by:

associating a respective source zones with the source network identifiers and associating a respective destination zone with the destination network identifiers; and combining the network traffic events that have like source zones and like destination zones.

16. The device of claim 15, wherein the controller is further configured to associate the respective source zones with the source network identifiers and the associating the respective destination zone with the destination network identifiers by:

at least partially using a predefined map of zones of a network with which the application is communicating.

17. The device of claim 11, wherein a new firewall rule comprises respective indications of source zones and destination zones for allowed network traffic.

18. The device of claim 11, wherein all the new firewall rules define respective allowed network traffic such that the controller is further configured to, in the maintain mode, deny any network traffic that does not meet a new firewall.

19. The device of claim 11, wherein the controller is further configured to accept or deny the respective new firewall rules by:

rendering, at a display screen, the groups including respective indications of source zones and destination zones associated with the source network identifiers and the destination network identifiers;

rendering, at the display screen, with the groups, respective electronic buttons for selecting groups indicative of respective new firewall rules; and accepting or denying a respective new firewall rule based on selection of an electronic button for a respective group.

20. The device of claim 11, wherein the controller is further configured to accept or deny the respective new firewall rules by:

providing, to an acceptance device, an indication of a respective new firewall rule;

receiving, from the acceptance device, an acceptance or a denial of the respective new firewall rule; and accepting or denying the respective new firewall rule based on the acceptance or the denial received from the acceptance device.

* * * * *